United States Patent
Oda

(10) Patent No.: US 11,194,369 B2
(45) Date of Patent: Dec. 7, 2021

(54) COMMUNICATION APPARATUS AND METHOD TO DETECT CHANGE IN SURROUNDING ENVIRONMENT

(71) Applicant: LAPIS Semiconductor Co., Ltd., Yokohama (JP)

(72) Inventor: Daisuke Oda, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 16/357,886

(22) Filed: Mar. 19, 2019

(65) Prior Publication Data
US 2019/0302018 A1  Oct. 3, 2019

(30) Foreign Application Priority Data

Mar. 28, 2018  (JP) .............................. JP2018-061494

(51) Int. Cl.
| | |
|---|---|
| G06F 1/16 | (2006.01) |
| G01N 21/55 | (2014.01) |
| H04W 4/80 | (2018.01) |
| G06F 1/3203 | (2019.01) |
| H05B 47/11 | (2020.01) |
| H05B 47/105 | (2020.01) |
| H05B 47/19 | (2020.01) |

(52) U.S. Cl.
CPC ........... *G06F 1/1698* (2013.01); *G01N 21/55* (2013.01); *G06F 1/3203* (2013.01); *H04W 4/80* (2018.02); *H05B 47/105* (2020.01); *H05B 47/11* (2020.01); *H05B 47/19* (2020.01)

(58) Field of Classification Search
CPC ..... G01N 21/81; G01N 21/783; G06F 1/1698
See application file for complete search history.

(56) References Cited

U.S. PATENT DOCUMENTS

| | | | |
|---|---|---|---|
| 2006/0132351 A1* | 6/2006 | Le Sesne | G01F 23/284 342/124 |
| 2018/0100807 A1* | 4/2018 | Abdo | G01N 31/22 |

FOREIGN PATENT DOCUMENTS

JP  2007-172214 A  7/2007

OTHER PUBLICATIONS

English machine translation of JP2007172214A, Takami (Year: 2007).*

* cited by examiner

*Primary Examiner* — Dominic J Bologna
(74) *Attorney, Agent, or Firm* — Rabin & Berdo, P.C.

(57) ABSTRACT

The present invention is aiming at providing a communication apparatus that is lower in power consumption and that can detect a change in surrounding environment and send out information indicating the detection result, and a method to detect a change in surrounding environment.

A communication apparatus of the present invention includes: a member containing a functional dye material that changes an optical property thereof in accordance with a change in surrounding environment and that maintains a post-change optical property; an optical sensor having a light-receiving portion and disposed such that the light-receiving portion receives light that has passed through the member, the optical sensor detecting a luminance of light that is received by the light-receiving portion; and a communication control unit that transmits information indicating the luminance detected by the optical sensor.

9 Claims, 14 Drawing Sheets

COMMUNICATION APPARATUS AND METHOD TO DETECT CHANGE IN SURROUNDING ENVIRONMENT

BACKGROUND OF THE INVENTION

Technical Field

The present invention relates to a communication apparatus communicating information data and a method to detect a change in a surrounding environment.

Background Arts

In recent years, a system configuration using the IoT (Internet of Things) is actively researched and developed. The key to the wide spread of IoT is simple accessibility via wireless communications and the sensing technology to collect the information on surroundings. Typical IoT devices are made up of a combination of a wireless device and a sensor device, but because of the large power consumption thereof, a large power source is required, which increases the price of the device.

In order to solve this problem, a passive type RFID (Radio Frequency Identification) tag including a light-receiving element as a sensor device together with a memory element is proposed (see Japanese Patent Application Laid-open Publication No. 2007-172214). In the passive type RFID tag, the wireless power supply where the power voltage is self-generated by radio wave output from a reader/writer (reading device) is performed.

SUMMARY OF THE INVENTION

The passive type RFID tag is not equipped with a power source such as a battery, which makes it possible to reduce the power consumption, price, and size of the device. However, because power is not supplied in areas outside of the communication area of the reader/writer, the sensor device cannot operate in such areas.

That is, when communications with the reader/writer are not possible, the passive type RFID tag cannot detect the surrounding environment using the sensor device.

In order to solve this problem, the embodiments of the present invention are directed to providing a communication apparatus that is lower in power consumption than conventional devices and smaller in size than conventional devices and that can detect a change in a surrounding environment and send out information indicating the detection result, and a method to detect a change in surrounding environment.

A communication apparatus of the present invention includes: a member or layer containing a functional dye material that changes an optical property thereof in accordance with a change in surrounding environment and that maintains the post-change optical property; an optical sensor having a light-receiving portion and disposed such that the light-receiving portion receives light that has passed through the member, the optical sensor detecting a luminance of light that is received by the light-receiving portion; and a communication control unit that transmits information indicating the luminance detected by the optical sensor.

A method to detect a change in environment of the present invention is a method to detect a change in surrounding environment, and includes detecting a luminance of light that has passed through a member containing a functional dye material that changes an optical property thereof in accordance with a change in surrounding environment and that maintains the post-change optical property; and detecting the change in environment based on a comparison result between the size of the detected luminance and the size of a reference luminance.

In the communication apparatus of the present invention, a change in environment is detected based on the state of the optical property of an optical member containing a functional dye material that changes an optical property thereof in accordance with a change in surrounding environment and that maintains the post-change optical property, and the detection result is stored. Thereafter, the luminance of light that has passed through the optical member is detected when the power is supplied, and this information is transmitted as the information indicating the detection result of a change in environment.

With this configuration, it is possible to detect a change in environment and store the detection result even when no power is supplied. Thus, according to the present invention, there is no need to install a power source such as a battery, and therefore, it is possible to detect a change in surrounding environment and send out information indicating the detection result with a configuration that is lower in power consumption and smaller in size.

DETAILED DESCRIPTION OF THE INVENTION

Below, embodiments of the present invention will be explained in detail with reference to figures.

Figure 1:
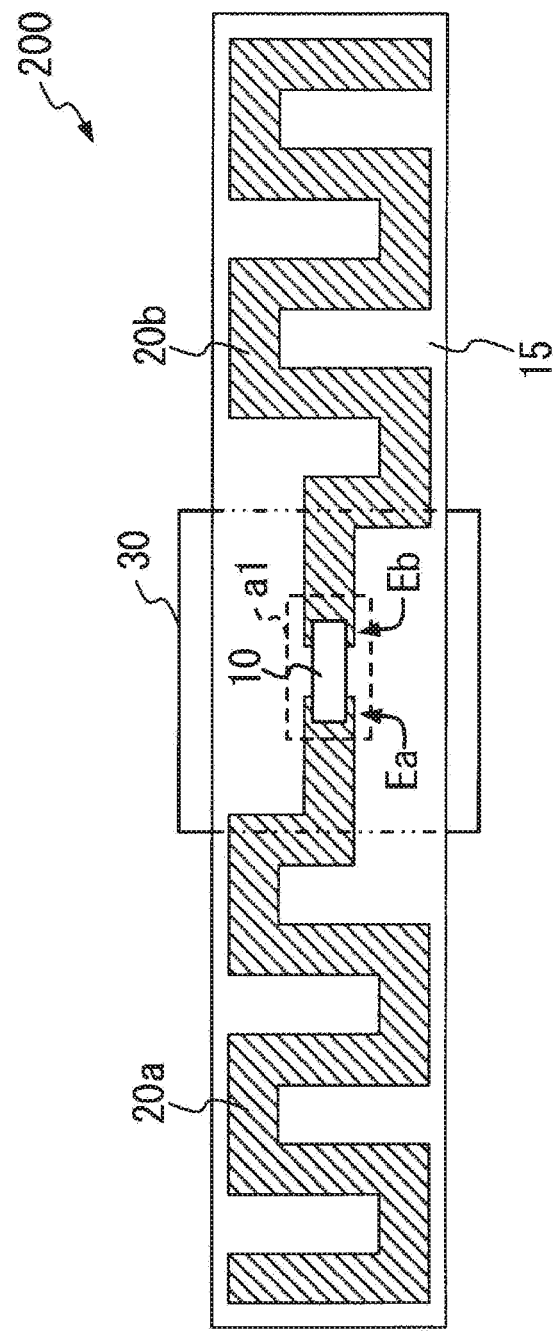
FIG. 1 is a plan view of an RFID sensor tag 200, which is the communication apparatus according to an embodiment of the present invention, viewed from above a side where an antenna is formed.

FIG. 1 is a plan view of a passive RFID sensor tag 200, which is the communication apparatus according to an embodiment of the present invention, viewed from above a side where an antenna is formed.

The RFID sensor tag 200 includes an RFID (Radio Frequency Identification) chip 10 equipped with an optical sensor and a communication circuit, a substrate 15, communication antennas 20a and 20b, and a dye plate 30.

Each of the antennas 20a and 20b is made of a conductive wiring material, for example, and is printed in a winding pattern on one side of the substrate 15. As shown in FIG. 1, the end portion Ea of the antenna 20a and the end portion Eb of the antenna 20b face each other across a predetermined distance. The substrate 15 may be a flexible substrate made of PET (polyethylene terephthalate) or the like, for example.

The RFID chip 10 is arranged above the end portion Ea of the antenna 20a and the end portion Eb of the antenna 20b to connect the two.

Figure 2:
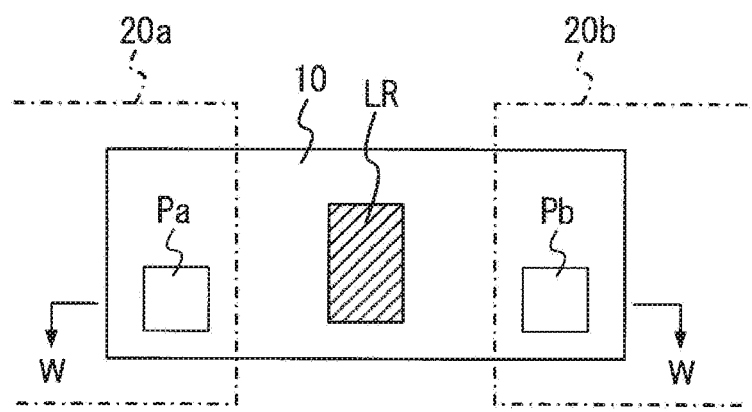
FIG. 2 is a plan view showing one side of an RFID chip 10 viewed from the front surface of a substrate 15, focusing on the area al of FIG. 1.
Figure 3:
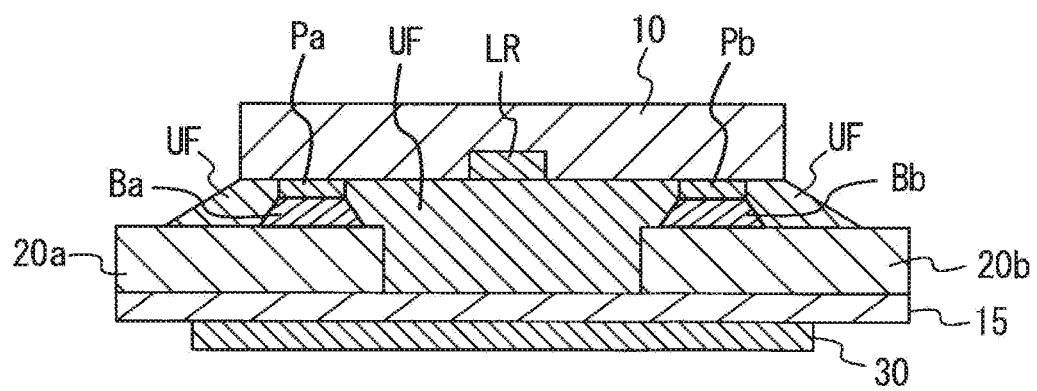
FIG. 3 is a cross-sectional view showing the cross-sectional structure of the RFID sensor tag 200 taken along the line W-W of FIG. 2.

FIG. 2 is a plan view showing one side (will be referred to as a front surface) of the RFID chip 10 viewed from the front surface of the substrate 15, focusing on the area al of FIG. 1. FIG. 3 is a cross-sectional view showing the cross-sectional structure of the RFID sensor tag 200, taken along the line W-W of FIG. 2.

As shown in FIGS. 2 and 3, on the surface of the RFID chip 10 facing one surface of the substrate 15 (will be referred to as the front surface of the RFID chip 10), a light-receiving portion LR of an optical sensor (described later) and pads Pa and Pb, which act as external terminals, are disposed. As shown in FIGS. 2 and 3, the light-receiving portion LR is disposed in a region between the end portion Ea of the antenna 20a and the end portion Eb of the antenna 20b on the front surface of the RFID chip 10. In the example of FIG. 2, both of the pads Pa and Pb are arranged along one side of the outer edges on the front surface of the RFID chip 10, but the pads Pa and Pb may alternatively be arranged diagonally on the front surface of the RFID chip 10. That is, the arrangement of the pads Pa and Pb is shown in FIG. 2 by way of one example embodiment, but the pads Pa and Pb may be arranged in any positions that can achieve desired reception or transmission characteristics.

As shown in FIG. 3, the pad Pa is electrically connected to the antenna 20a via a bump Ba, and the pad Pb is electrically connected to the antenna 20b via a bump Bb. An underfill UF is formed around the front surface of the RFID chip 10 and between the front surface of the RFID chip 10 and the substrate 15. The substrate 15 and the underfill UF are made of a material that is capable of transmitting light within a predetermined wavelength range, which the optical sensor is intended to receive.

The RFID chip 10 is affixed to the substrate 15 and the antennas 20a and 20b by the above-described bumps Ba and Bb and the underfill UF. However, according to another embodiment of the invention, as long as the durability is secured, there is no need to provide the underfill UF between the front surface of the RFID chip 10 and the substrate 15.

Figure 4:
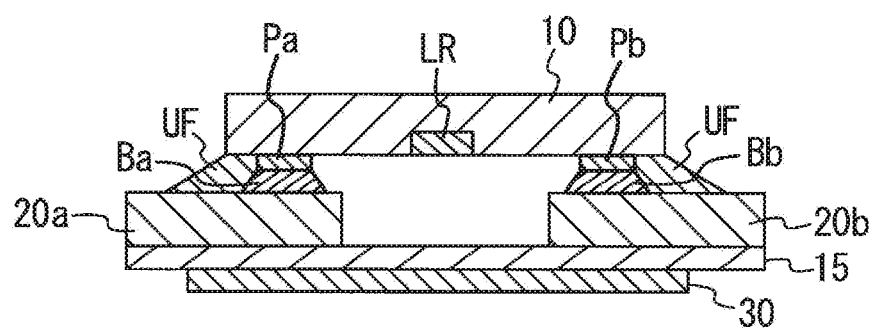
FIG. 4 is a cross-sectional view showing a modification example of the cross-sectional structure of the RFID sensor tag 200, taken along the line W-W of FIG. 2.

FIG. 4 is a cross-sectional view taken along the line W-W of FIG. 2, showing a modification example of the cross-sectional structure of the RFID sensor tag 200, which was made in view of such a point. With the configuration shown in FIG. 4, a space is made between the light-receiving portion LR and the substrate 15, and thus, it is no longer necessary to take into consideration the wavelength characteristics of light, which the optical sensor is intended to receive, in selecting the material of the underfill UF.

As shown in FIGS. 1 and 3, in the RFID sensor tag 200, a dye plate 30 is disposed at a position facing the RFID chip 10 on the other surface of the substrate 15 (the surface on which the antennas 20a and 20b are not formed).

The dye plate 30 is an optical member containing a functional dye material that changes the optical property thereof in accordance with a change in surrounding environment. Examples of the functional dye material include a dye material used for a time temperature indicator, or TTI. That is, for this functional dye material, an irreversible thermosensitive material that changes the color thereof when the ambient temperature goes beyond a prescribed temperature threshold and that maintains the post-change color regardless of the ambient temperature is used. Known examples of such an irreversible thermosensitive material include thermochromic dyes such as azomethine, polyacetylene, P-benzoquinone dielectric, imidazole, cholesteric liquid crystal, and triphenylmen. The dye plate 30 may be described as a plate, layer, substrate, or film, or may comprise any other member that is capable of having stored therein a functional dye material, or having an inherent property of changing on optical property of the member in accordance with a change of the surrounding environment.

In the example shown in FIG. 3, the dye plate 30 is attached to the other surface of the substrate 15, but it is possible to dispose the dye plate 30 in a region between the end portion Ea of the antenna 20a and the end Eb of the antenna 20b on the front surface of the substrate 15.

Figure 5:
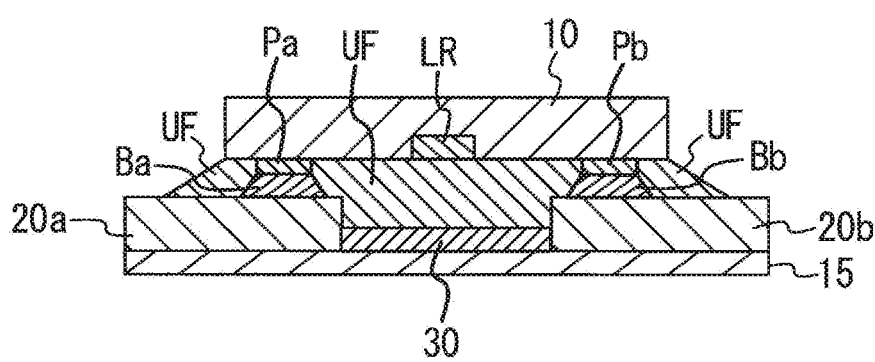
FIG. 5 is a cross-sectional view showing another modification example of the cross-sectional structure of the RFID sensor tag 200, taken along the line W-W of FIG. 2.

FIG. 5 is a cross-sectional view taken along the line W-W of FIG. 2, showing a modification example of the cross-sectional structure of the RFID sensor tag 200, which was made in view of such a point. With the configuration of FIG.

5, the area of the dye plate 30 is reduced as compared with the configuration shown in FIGS. 3 and 4, which makes it possible to lower the price.

Next, the operation of the RFID sensor tag 200 will be explained.

Figure 6:
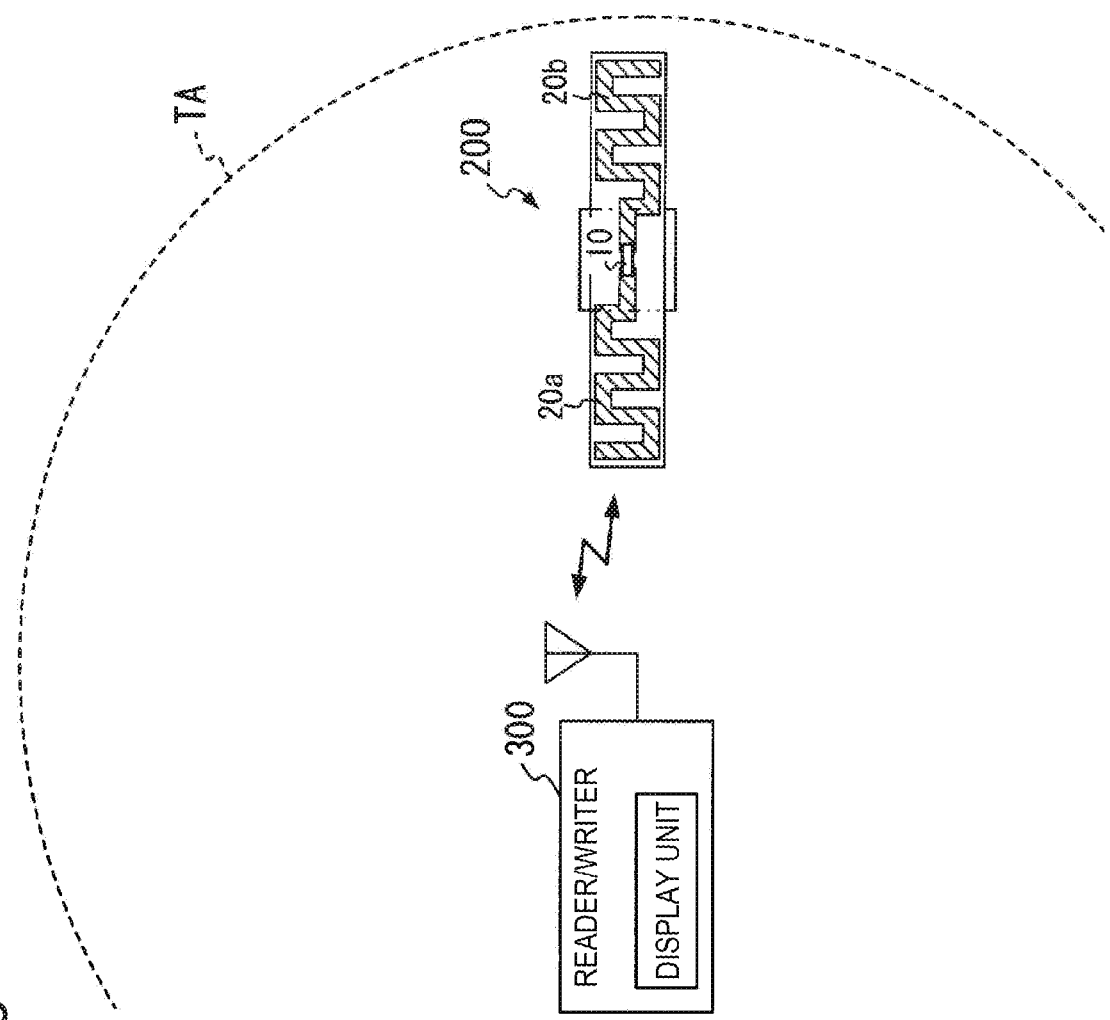
FIG. 6 is a diagram showing a configuration to perform wireless communication between the RFID sensor tag 200 and a reader/writer 300.

As illustrated in FIG. 6, the RFID sensor tag 200 performs close-distance wireless communications using the communication radio wave of UHF (ultra-high frequency) band, HF (high frequency) band, or LF (low frequency) band, for example, with the reader/writer 300. That is, the RFID sensor tag 200 is supplied with power via the radio waves radiated from the reader/writer 300 and exchanges information with the reader/writer 300 in the communication area TA only, which is within the 10-meter radius from the reader/writer 300, for example.

Figure 7:
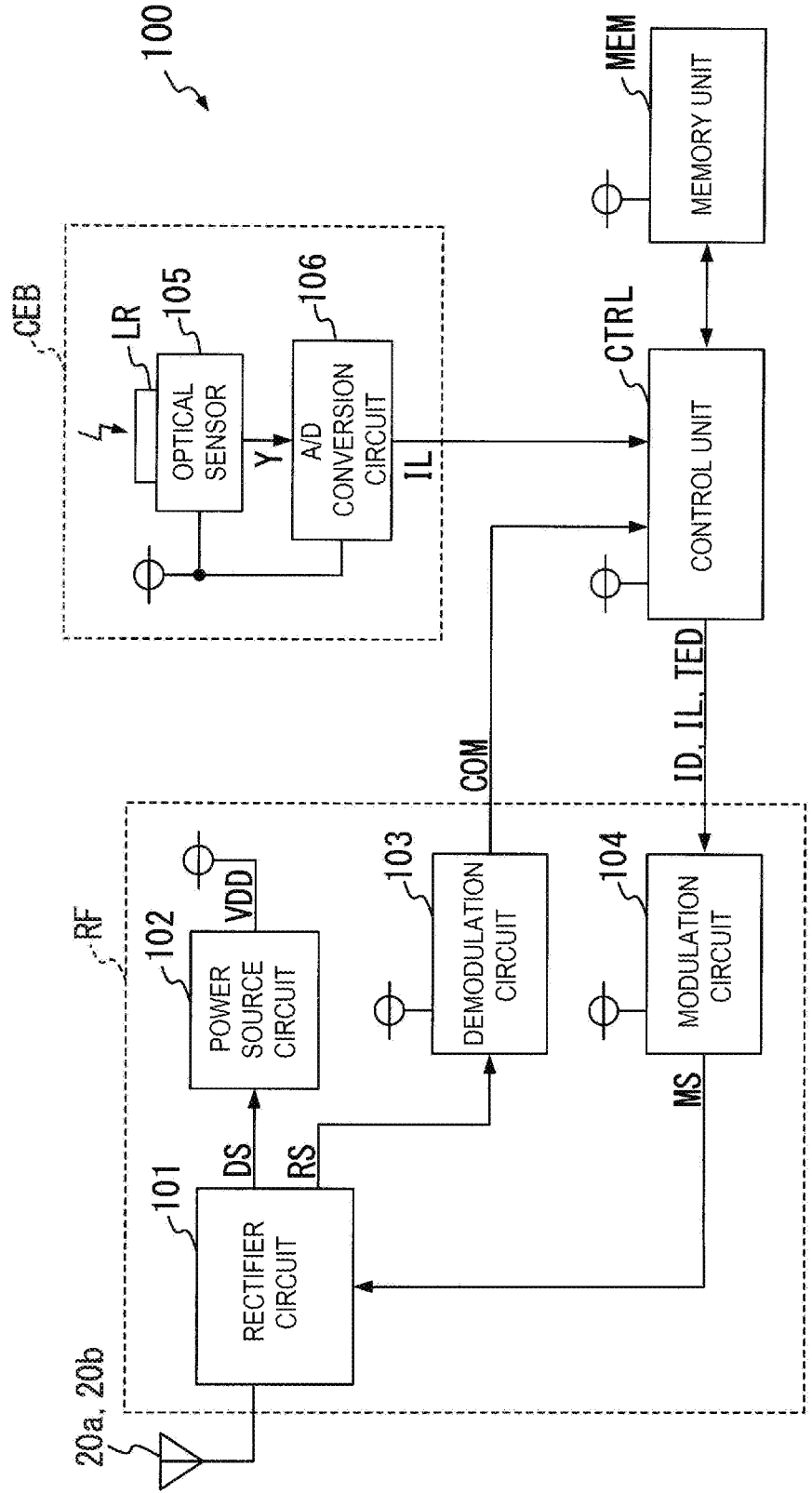
FIG. 7 is a block diagram showing the configuration of a communication circuit 100.

FIG. 7 is a circuit diagram showing the configuration of the communication circuit 100 included in the RFID chip 10 of the RFID sensor tag 200.

As shown in FIG. 7, the communication circuit 100 includes a trans-receiver RF, a sensor unit CEB, a control unit CTRL, and a memory unit MEM.

The trans-receiver RF includes a rectifier circuit 101, a power source circuit 102, a demodulation circuit 103, and a modulation circuit 104.

The rectifier circuit 101 is connected to the antennas 20a and 20b via the pads Pa and Pb. The antennas 20a and 20b receive radio waves emitted from the reader/writer 300, and supply a high-frequency signal indicating the received information and the high-frequency current for power supply, which are obtained from the radio waves, to the rectifier circuit 101 via the pads Pa and Pb.

The rectifier circuit 101 supplies a direct-current voltage DS obtained by rectifying the high-frequency current to the power source circuit 102, and supplies a reception signal RS obtained by rectifying and inspecting the high-frequency signal to the demodulation circuit 103.

The power source circuit 102 generates a power source voltage VDD having a constant voltage value based on the direct-current voltage DS, and supplies this power source voltage VDD to the demodulation circuit 103, the modulation circuit 104, the sensor unit CEB, the control unit CTRL, and the memory unit MEM. That is, the power source circuit 102 generates a power source voltage VDD based on the received high-frequency power, and supplies this power source voltage VDD to the demodulation circuit 103, the modulation circuit 104, the sensor unit CEB, the control unit CTRL, and the memory unit MEM.

While the power source voltage VDD is supplied, the demodulation circuit 103, the modulation circuit 104, the sensor unit CEB, the control unit CTRL, and the memory unit MEM perform the following operations.

The demodulation circuit 103 supplies a command code COM obtained by performing a modulation process on the reception signal RS to the control unit CTRL.

The modulation circuit 104 supplies, to the rectifier circuit 101, a modulation signal MS obtained by modulating a carrier signal corresponding to the band of the communication radio wave described above based on identification information ID, luminance information IL, or environmental change information TED supplied from the control unit CTRL. The rectifier circuit 101 supplies the modulation signal to the antennas 20a and 20b via the pads Pa and Pb. Then, the antennas 20a and 20b releases communication radio waves indicating the identification information ID, luminance information IL, or environmental change information TED.

The sensor unit CEB includes an optical sensor 105 and an A/D conversion circuit 106. The optical sensor 105 has the light-receiving portion LR shown in FIG. 2, and detects the luminance of light within a prescribed wavelength range, which is part of the light received by the light-receiving potion LR through the dye plate 30. The optical sensor 105 generates a luminance signal Y having a signal level corresponding to the detected luminance, and supplies this signal to the A/D conversion circuit 106. The A/D conversion circuit 106 supplies to the control unit CTRL the luminance information IL obtained by converting the luminance signal Y to a digital value.

The memory unit MEM has stored therein in advance the identification information indicating the identification number assigned to an individual RFID sensor tag 200 as a product, and reference luminance information indicating the reference luminance corresponding to a prescribed temperature threshold. The memory unit MEM is a non-volatile semiconductor memory, for example, and reads out the identification information stored therein in response to the identification information read-out command supplied from the control unit CTRL, and supplies the read-out information to the control unit CTRL as the identification information ID.

The control unit CTRL supplies the identification information read-out command to the memory unit MEM when the command code COM supplied from the demodulation circuit 103 indicates a request to read out the identification information, so that the identification information ID is read out from the memory unit MEM. The control unit CTRL supplies the identification information ID read out from the memory unit MEM to the modulation circuit 104.

When the command code COM indicates a request to obtain the luminance information, the control unit CTRL retrieves the luminance information IL from the sensor unit CEB, and supplies this information to the modulation circuit 104.

When the command mode COM indicates a request to obtain the environment change information, the control unit CTRL first reads out the reference luminance information described above from the memory unit MEM. Next, the control unit CTRL compares the size of the reference luminance indicated by the reference luminance information with the size of the luminance indicated by the luminance information IL supplied from the sensor unit CEB. If the luminance indicated by the luminance information IL is equal to or smaller than the reference luminance, the control unit CTRL generates the environment change information TED indicating that the RFID sensor tag 200 is under a temperature lower than the temperature threshold. On the other hand, if the luminance indicated by the luminance information IL is greater than the reference luminance, the control unit CTRL generates the environment change information TED indicating that the RFID sensor tag 200 is under a temperature higher than the temperature threshold.

That is, the control unit CTRL generates, as the environment change information TED, information indicating whether or not the temperature, which is the surrounding environment of the RFID sensor tag 200, has changed from a level lower than the temperature threshold to a level higher than that. Then, the control unit CTRL supplies the environment change information TED generated in the manner described above to the modulation circuit 104.

Next, the sequence of the information communications performed between the RFID sensor tag 200 having the configuration described above and the reader/writer 300 will be explained.

First, the reader/writer 300 transmits a communication radio wave representing a command code that indicates the read-out request of the identification information described above. Upon receiving the communication radio wave representing the read-out request of the identification information, the RFID sensor tag 200 transmits a communication radio wave representing the identification information ID thereof. Upon receiving the communication radio wave representing the identification information ID, the reader/writer 300 takes in the identification information ID and subsequently transmits a communication radio wave representing a command code requesting the luminance information or the environmental change information.

Upon receiving the communication radio wave representing the request for the luminance information, the RFID sensor tag 200 detects, through the optical sensor 105, the luminance (Y) of the light received by the light-receiving portion LR through the dye plate 30. Thereafter, the RFID sensor tag 200 transmits a communication radio wave representing the luminance information IL that indicates the detected luminance. That is, the RFID sensor tag 200 transmits the luminance detected by the optical sensor 105 as the information indicating whether or not the temperature, which is the surrounding environment of the RFID sensor tag 200, has changed from a level lower than the temperature threshold to a level higher than that (although embodiments of the invention encompass indicators of a temperature either above or below the temperature threshold, respectively, based on desired design characteristics of the circuit).

Upon receiving the communication radio wave representing the luminance information IL, the reader/writer 300 compares the size of the reference luminance corresponding to the above-described temperature threshold with the size of the luminance indicated by the luminance information IL. As a result of the comparison, if the luminance indicated by the luminance information IL is smaller than the reference luminance, the reader/writer 300 displays, in the display unit, an image indicating that the RFID sensor tag 200 has continuously been under a temperature lower than the temperature threshold. On the other hand, if the luminance indicated by the luminance information IL is equal to or greater than the reference luminance, the reader/writer 300 displays, in the display unit, an image indicating that the RFID sensor tag 200 has been under a temperature higher than the temperature threshold.

That is, the reader/writer 300 provides the user with the information indicating whether or not the temperature around the RFID sensor tag 200 has changed from a level lower than the predetermined temperature threshold to a level higher than that, based on the luminance information transmitted from the RFID sensor tag 200

Below, the operation of the RFID sensor tag 200 will be described with an example in which the RFID sensor tag 200 is affixed to an article, a food item or the like that is subjected to quality deterioration when the ambient temperature reaches 50 degrees C. or higher during transport.

In this example, an irreversible thermosensitive material having a color visually perceived as white under a temperature lower than the temperature threshold, which is 50 degrees C., for example, changes its color from white to red if exposed to a temperature that is equal to or higher than the temperature threshold for a prescribed period of time, and thereafter remains the color red regardless of the temperature change, is used as the functional dye material contained in the dye plate 30. While in this example a material that changes from white to red is used, embodiments of the invention encompass any materials that change between any two or more colors according to design considerations of the RFID sensor tag 200.

The optical sensor 105 is a sensor having different levels of detection sensitivity to the luminance between the wavelength of the post-change color of the functional dye material, which is red, and the wavelength of the pre-change color, which is white. Specifically, in the optical sensor 105, the detection sensitivity for the wavelength of red light is lower than that for the wavelength of white light.

During transport, the RFID sensor tag 200 cannot receive power supply from the reader/writer 300, and therefore, all operations of the communication circuit 100 are stopped.

Figure 8:
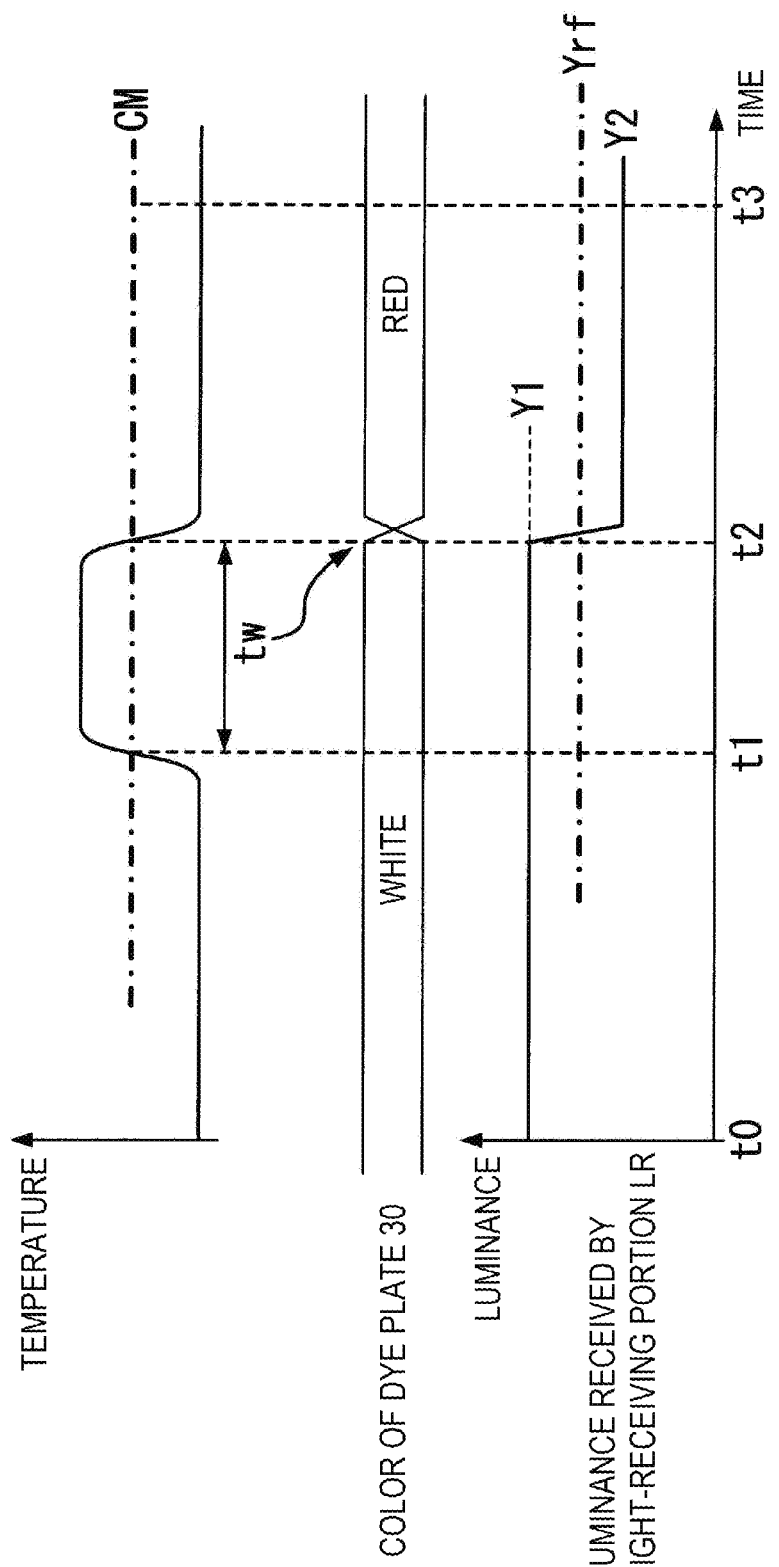
FIG. 8 is a diagram showing an example of the transition of the ambient temperature of the RFID sensor tag 200, the color state of the color plate 30, and the luminance of the incident light on a light-receiving portion LR.

As shown in FIG. 8, since the ambient temperature is lower than the predetermined temperature threshold CM (for example, 50 degrees C.) in the time period from the time t0, which is the start of the transport, to the time t1, the color of the functional dye contained in the dye plate 30 is "White." Thus, in the time period form the time t0 to the time t1, the luminance of light received by the light-receiving portion LR through the dye plate 30 is Y1.

After passing the time t1, as shown in FIG. 8, the ambient temperature exceeds the temperature threshold CM and stays at the level for a prescribed period of time tw. At the time t2 after the prescribed period of time tw has passed, the ambient temperature goes down to a level lower than the temperature threshold CM. As described above, if the ambient temperature stays at a level higher than the temperature threshold CM for a prescribed period of time tw, the color of the functional dye contained in the dye plate 30 changes from white to red as shown in FIG. 8. Also, as shown in FIG. 8, after the time t2, the ambient temperature goes down to a level lower than the temperature threshold CM, but the color of the functional dye contained in the dye plate 30 remains red. Thus, after the time t2, the luminance of light received by the light-receiving portion LR through the dye plate 30 maintains at the level of the luminance Y2 that is lower than the luminance Y1 regardless of a change in ambient temperature as shown in FIG. 8.

As described above, power is not supplied from the reader/writer 300 during transport, and thus, the optical sensor 105 of the RFID sensor tag 200 does not generate the luminance signal Y during this time.

Thereafter, at the time t3 shown in FIG. 8, the RFID sensor tag 200 enters the communication area TA of the reader/writer 300 as shown in FIG. 6. As a result, the communication circuit 100 of the RFID sensor tag 200 receives power from the reader/writer 300 via wireless communications and performs the operations described below.

That is, first the command code requesting the luminance information is sent from the reader/writer 300 to the RFID sensor tag 200. Upon receiving the request for the luminance information, the RFID sensor tag 200 transmits the luminance information IL representing the luminance Y2 shown in FIG. 8 to the reader/writer 300 as the luminance of the light received by the light-receiving portion LR through the dye plate 30. Upon receiving the luminance information IL, the reader/writer 300 compares the size of the luminance Y2 indicated by the luminance information IL with the size of the reference luminance Yrf shown in FIG. 8.

In this example, since the luminance Y2 indicated by the luminance information IL is lower than the reference luminance Yrf, the reader/writer 300 determines that the RFID sensor tag 200 has been under a temperature environment where the ambient temperature is higher than the temperature threshold CM. The reader/writer 300 displays an image indicating that information.

As a result, the user is made aware of the fact that the article or food item has been under a temperature higher than the temperature threshold CM during transport, and thus the quality of the article or food item has deteriorated.

On the other hand, if the RFID sensor tag 200 enters the communicable area TA of the reader/writer 300 shown in FIG. 6 at the time t 1 shown in FIG. 8, the RFID sensor tag 200 transmits the luminance information IL representing the luminance Y1 shown in FIG. 8 to the reader/writer 300. Upon receiving the luminance information IL, the reader/writer 300 compares the size of the luminance Y1 indicated by the luminance information IL with the size of the reference luminance Yrf shown in FIG. 8. Because the luminance Y1 indicated by the luminance information IL is greater than the reference luminance Yrf, the reader/writer 300 displays an image indicating that the RFID sensor tag 200 has continuously been under a temperature lower than the temperature threshold CM.

As a result, the user is made aware of the fact that the article or food item has not been under a temperature higher than the temperature threshold CM during transport, and thus the quality of the article or food item has not deteriorated.

When the RFID sensor tag 200 receives the communication radio wave requesting the environmental change information transmitted from the reader/writer 300, the RFID sensor tag 200 transmits the environmental change information TED generated by the control unit CTRL to the reader/writer 300. Upon receiving this environmental change information TED, the reader/writer 300 displays, in the display unit, information indicating the content of the environment change information TED, or in other words, whether the RFID sensor tag 200 has been under a temperature equal to or lower than the temperature threshold CM or the RFID sensor tag 200 has been under a temperature higher than the temperature threshold CM.

As described in detail above, the RFID sensor tag 200 detects a change in ambient temperature based on the color state of the dye plate 30 containing the functional dye material that changes the color thereof in accordance with the ambient temperature change and that maintains the post-change color state, and stores the detection result. Then, the RFID sensor tag 200 transmits the luminance of light received through the dye plate 30 as the information indicating the detection result of a change in ambient temperature via wireless communications.

Because the RFID sensor tag 200 can detect a change in ambient temperature and stores the change without receiving power, it is possible to achieve a reduction in power consumption. Also, because the RFID sensor tag 200 does not require a power source such as a battery, both a reduction in size and reduction in power consumption can be achieved at the same time.

In the embodiment shown in FIG. 8, when the ambient temperature exceeds the temperature threshold value CM, the dye plate 30 lowers the luminance of the light incident on the light-receiving portion LR from the luminance Y1 to the luminance Y2. However, the dye plate 30 may alternatively contain a functional dye material with an optical property that increases the luminance of the light entering the light-receiving portion LR from the luminance Y1 to a prescribed level higher than the luminance Y1 when the ambient temperature exceeds the temperature threshold CM. In this case, the reference luminance Yrf is set to a value lower than the prescribed luminance and higher than the luminance Y1. The dye plate 30 may alternatively contain a functional dye material with an optical property that changes the luminance of the light entering the light-receiving portion LR from the luminance Y1 to a prescribed level lower or higher than the luminance Y1 when the ambient temperature goes below the temperature threshold CM (0 degrees C. for example).

Communications between the RFID sensor tag 200 and the reader/writer 300 as shown in FIG. 6 are performed under various types of indoor and outdoor light sources such as fluorescent light, LED light, infrared light, incandescent light bulb, sunlight, and halogen lamp.

Those light sources have different wavelength components, respectively, and therefore, depending on the properties of the optical sensor 105 and the properties of the dye contained in the dye plate 30, light outside of a prescribed wavelength range is detected as noise, which results in erroneous detection.

Figure 9:
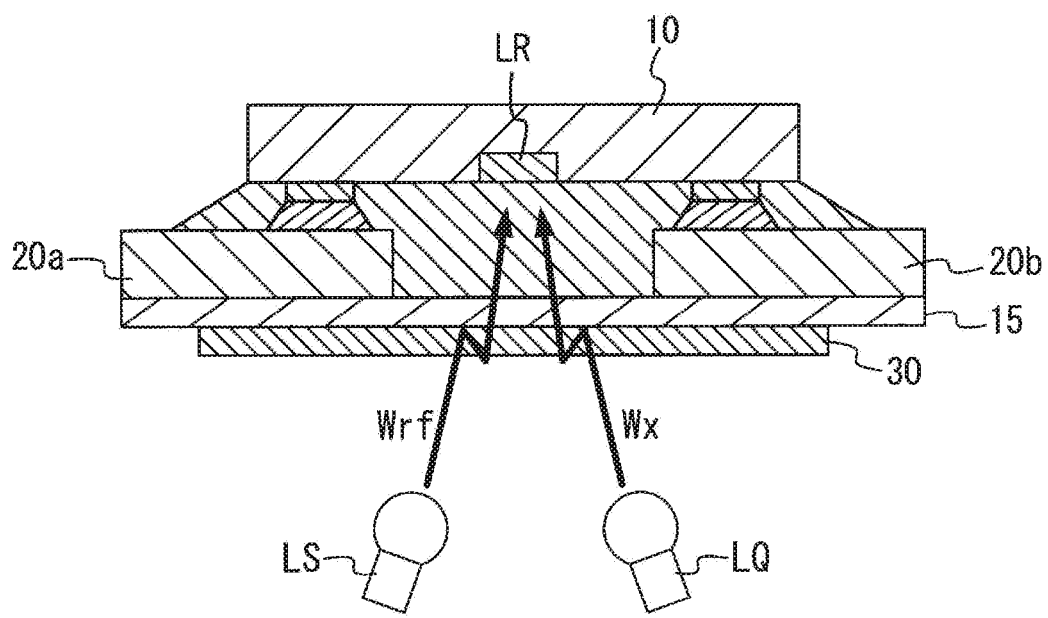
FIG. 9 is a diagram illustrating a case in which the light-receiving portion LR of the optical sensor 105 receives light from a light source LS emitting light of the wavelength Wrf that is within a prescribed wavelength range, and a case in which the light-receiving portion LR receives light from a light source LQ emitting light of the wavelength Wx that is not within the prescribed wavelength range.

For example, as shown in FIG. 9, when the light-receiving portion LR of the optical sensor 105 receives light radiated from a light source LS emitting light of a wavelength Wrf, which is within a specific wavelength range, erroneous detection does not occur. However, when the light-receiving portion LR receives light radiated from a light source LQ emitting light of a wavelength Wx, which is outside of the specific wavelength range, erroneous detection could occur.

In order to prevent such erroneous detection, an optical filter to filter out the light outside of the specific wavelength range, which may be detected as noise, is provided in the path of light incident on the light-receiving portion LR.

Figure 10:
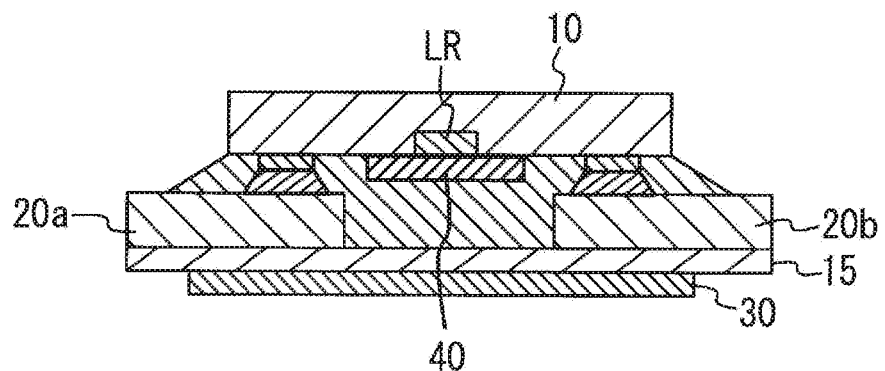
FIG. 10 is a cross-sectional view showing an example of the cross-sectional structure of the RFID sensor tag 200, taken along the line W-W of FIG. 2 when an optical filter 40 is provided.
Figure 11:
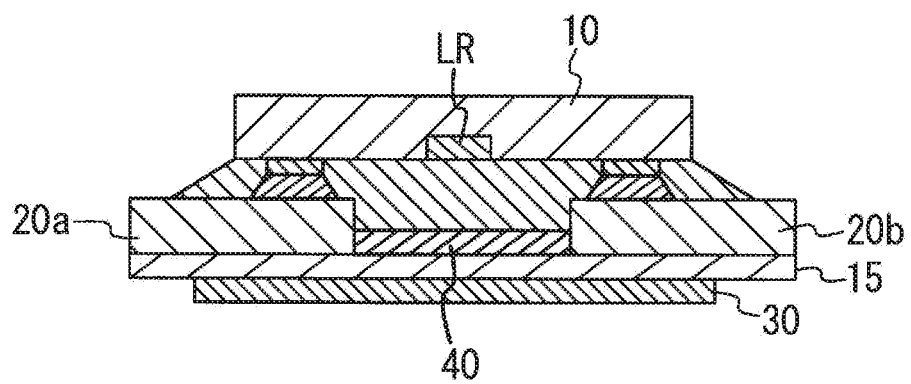
FIG. 11 is a cross-sectional view showing another example of the cross-sectional structure of the RFID sensor tag 200, taken along the line W-W of FIG. 2 when an optical filter 40 is provided.
Figure 12:
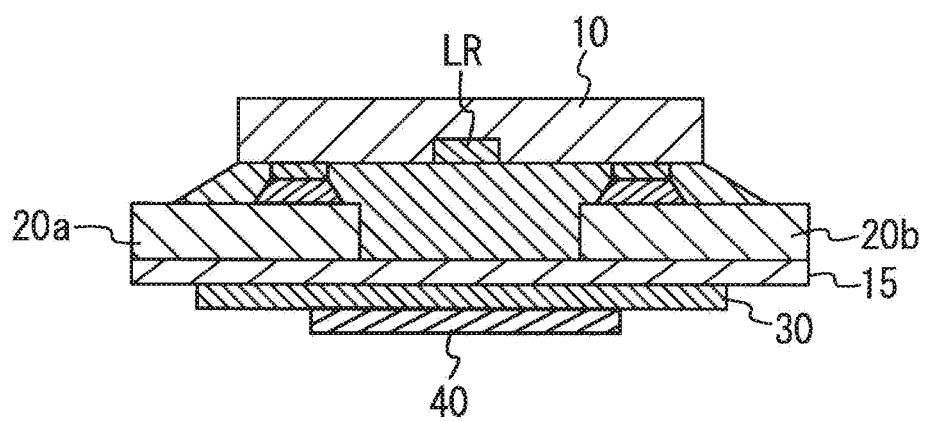
FIG. 12 is a cross-sectional view showing yet another example of the cross-sectional structure of the RFID sensor tag 200, taken along the line W-W of FIG. 2 when an optical filter 40 is provided.
Figure 13:
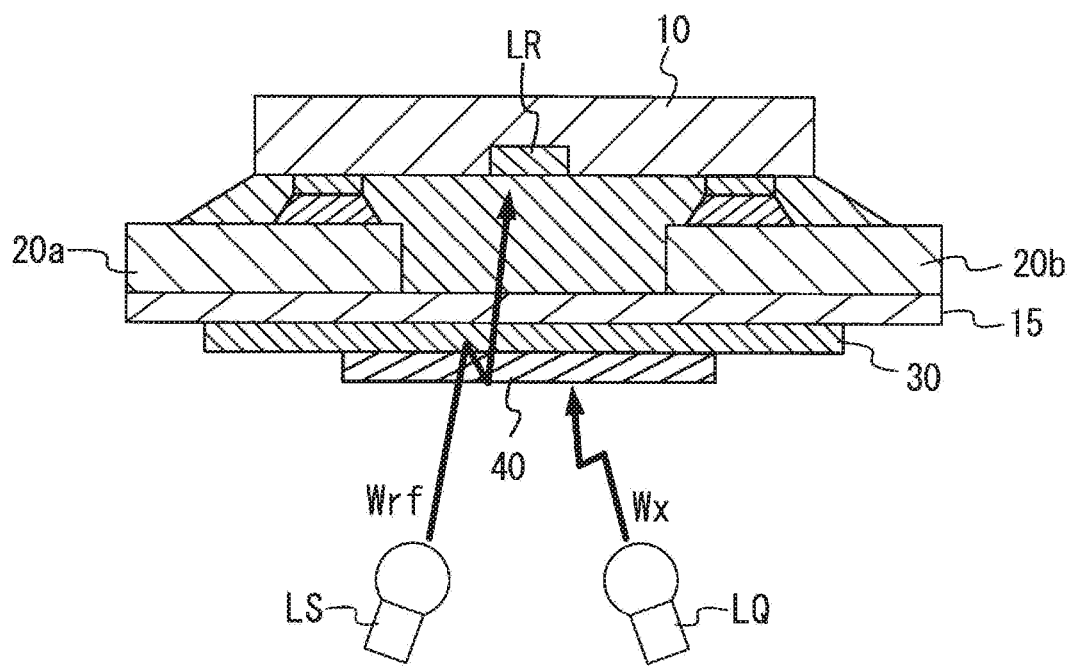
FIG. 13 is a diagram for explaining the effect of the optical filter 40.

FIGS. 10 to 12 are cross-sectional views, taken along the line W-W of FIG. 2, showing other examples of the cross-sectional structure of the RFID sensor tag 200, which were made in view of such a point.

FIG. 10 shows the cross-sectional structure of the RFID sensor tag 200 in which an optical filter 40 having a surface area covering the entire light-receiving portion LR is attached to the front surface of the RFID chip 10 as the optical filter for filtering out the light outside of the specific wavelength range. FIG. 11 shows the cross-sectional structure of the RFID sensor tag 200 in which the optical filter 40 is attached on the front surface of the substrate 15 in an area that includes the area facing the light-receiving portion LR and that entirely covers the area between the end portion Ea of the antenna 20a and the end portion Eb of the antenna 20b on the front surface of the substrate 15. FIG. 12 shows the cross-sectional structure of the RFID sensor tag 200 in which the optical filter 40 is attached on the other surface of the substrate 15 in an area that includes the area facing the light-receiving portion LR of the dye plate 30 and that overlaps the area between the end portion Ea of the antenna 20a and the end portion Eb of the antenna 20b.

As shown in FIGS. 10 to 12, by providing the optical filter 40 for filtering out the light outside of the specific wavelength range, a change in temperature can be detected with a high degree of reliability and few errors even under light sources of various wavelengths.

In the embodiments described above, if there is no light source nearby when the RFID sensor tag 200 and the reader/writer 300 attempt wireless communication as shown in FIG. 6, it is not possible to detect the state of the dye plate 30 by the optical sensor 105.

In order to solve this problem, the RFID chip 10 of the RFID sensor tag 200 may be provided with a light-emitting element that functions as a light source so that the state of the dye plate 30 can be detected even in dark places.

Figure 14:
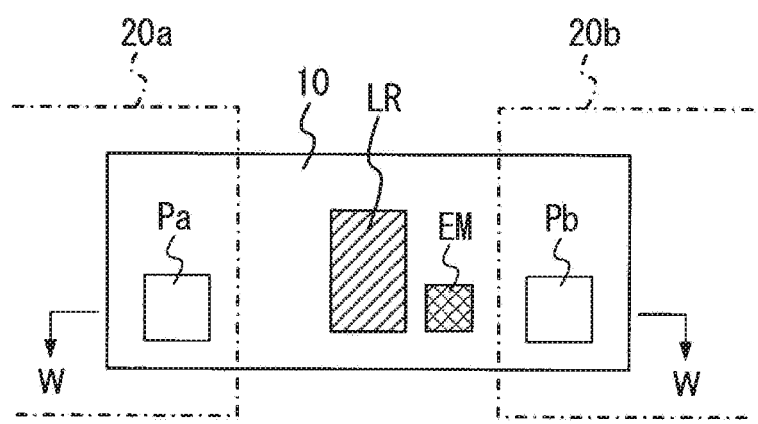
FIG. 14 is a plan view showing one side of an RFID chip 10 of another embodiment viewed from the front surface of a substrate 15, focusing on the area al of FIG. 1.
Figure 15:
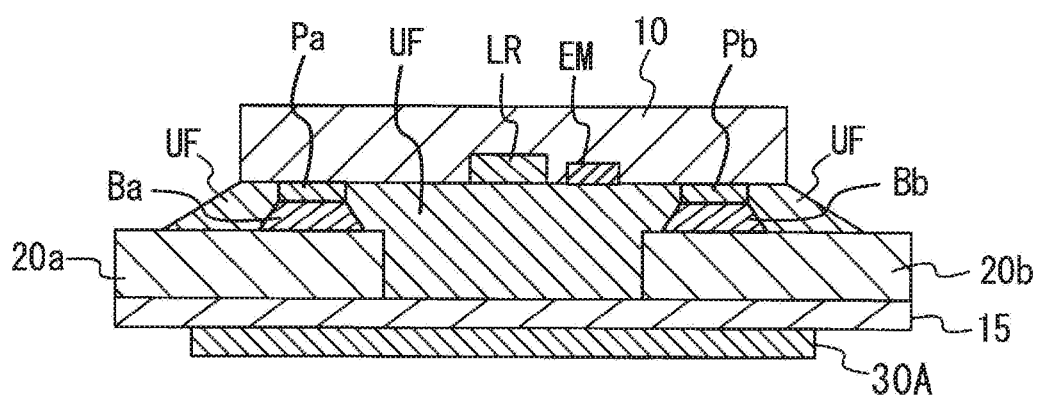
FIG. 15 is a cross-sectional view showing the cross-sectional structure of the RFID sensor tag 200, taken along the line W-W of FIG. 14.
Figure 16:
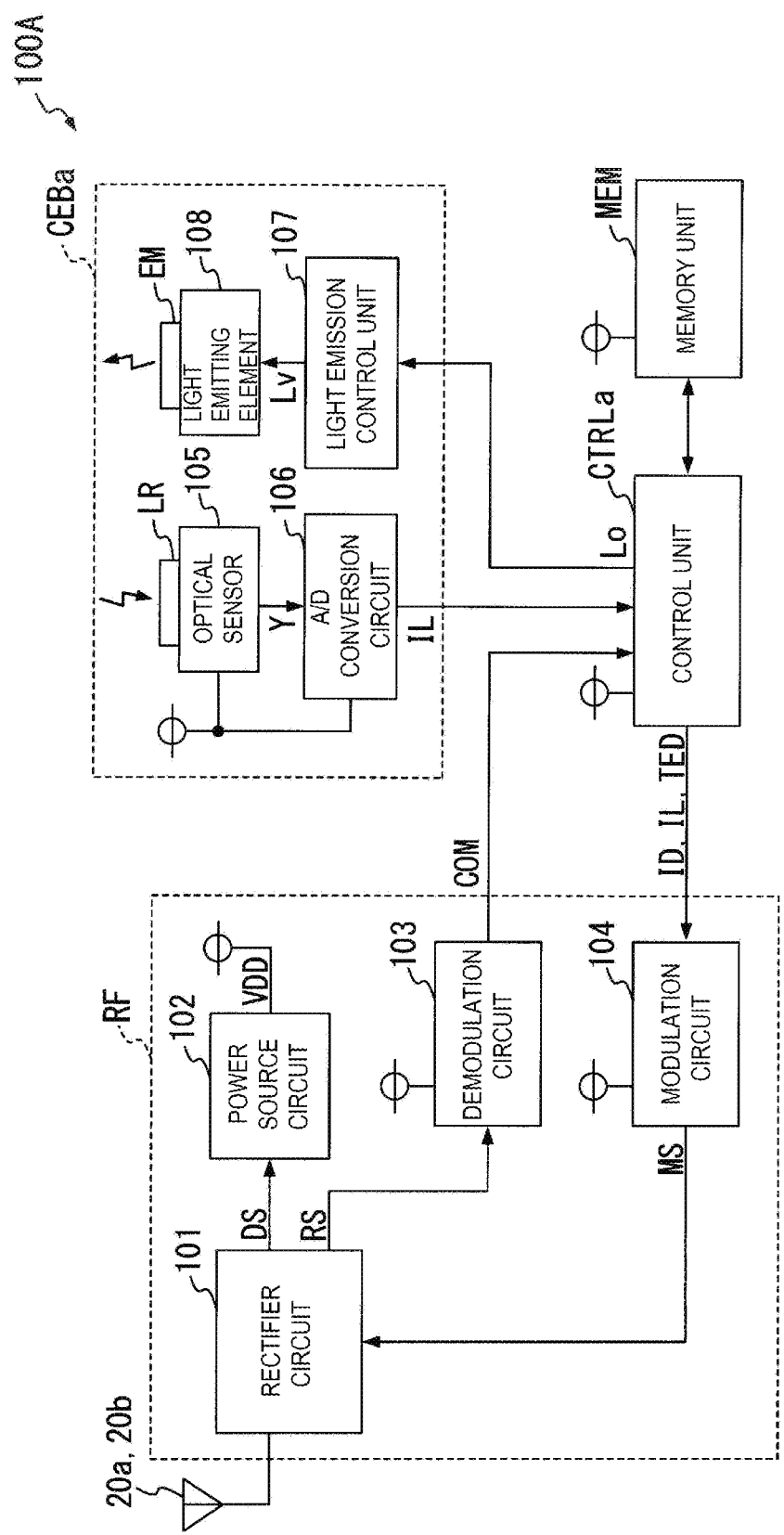
FIG. 16 is a block diagram showing the configuration of a communication circuit 100A included in the RFID chip 10 of FIGS. 14 and 15.

FIG. 14 is a plan view showing another configuration of the surface of the RFID chip 10, which was made in view of such a point, and FIG. 15 is a cross-sectional view showing the cross-sectional structure of the RFID sensor tag 200, taken along the line W-W of FIG. 14. FIG. 16 is a block diagram showing the configuration of a communication circuit 100A, which is a modification example of the communication circuit 100 included in the RFID chip 10.

The embodiment shown in FIGS. 14 to 16 have the same configuration as that of FIGS. 2 and 3 except that the dye plate 30 is replaced with a dye plate 30A, and the RFID chip 10 is equipped with a light-emitting element 108 having a light-emitting portion EM that emits light to the dye plate 30A and a light-emitting control circuit 107. The position of the light-emitting portion EM is not limited to that shown in FIG. 14 as long as it is arranged between the end portion Ea of the antenna 20a and the end portion Eb of the antenna 20b on the surface of the RFID chip 10.

The dye plate 30A is an optical member containing an irreversible thermosensitive material that changes the light reflectance thereof when the ambient temperature goes above (or below) a prescribed temperature threshold and that remains the post-change light reflectance even when the ambient temperature returns to a level below (or above) the temperature threshold.

In a manner similar to the dye plate 30, the dye plate 30A is disposed at a position facing the RFID chip 10 on the other surface of the substrate 15 (the surface on which the antennas 20a and 20b are not formed).

The communication circuit 100A shown in FIG. 16 has the same configuration as that shown in FIG. 7 except that a sensor unit CEBa is used instead of the sensor unit CEB and the control unit CTRLa is used instead of the control unit CTRL.

The internal configuration (optical sensor 105 and A/D conversion circuit 106) of the sensor unit CEBa is the same as that shown in FIG. 7 except that the light emission control circuit 107 and the light-emitting element 108 including the light-emitting portion EM described above are additionally provided.

The light emission control circuit 107 supplies the light-emitting element 108 with a light emission driving voltage Lv that causes the light-emitting element 108 to emit light over a prescribed light emission period according to a light emission command Lo supplied from the control unit CTRLa.

Based on the light emission driving voltage Lv, the light-emitting element 108 radiates light from the light-emitting portion EM to the dye plate 30A.

The control unit CTRLa supplies the light emission command Lo to the light emission control circuit 107 when the command code COM supplied from the demodulation circuit 103 requests the luminance information or the environmental change information. In response, the control unit CTRLa receives the luminance information IL and supplies the information to the modulation circuit 104.

Except for this, the operations performed by the control unit CTRLa are the same as those of the control unit CTRL described above.

Next, the sequence of the information communication performed between the RFID sensor tag 200 having the configuration of FIGS. 14 to 16 and the reader/writer 300 will be explained.

The RFID sensor tag 200 having the configuration shown in FIGS. 14 to 16 differs from the RFID sensor tag 200 having the configuration shown in FIGS. 2, 3, and 7 in performing the following operation upon receiving a command code requesting the illumination information or the environment change information transmitted from the reader/writer 300.

That is, in the RFID sensor tag 200 having the configuration shown in FIGS. 14 to 16, the light-emitting element 108 is first caused to emit light, and the light is emitted from the light-emitting portion EM toward the dye plate 30A. Subsequently, the RFID sensor tag 200 detects the luminance (Y) of the reflection light from the dye plate 30A by the optical sensor 105, and transmits, to the reader/writer 300, the luminance information IL indicating the detected luminance or the environmental change information generated in the manner described above based on the detected luminance.

Below, the operation of the RFID sensor tag 200 having the configuration of FIGS. 14 to 16 will be described with an example in which the RFID sensor tag 200 is affixed to an article, a food item or the like that is subjected to quality deterioration when the ambient temperature is 50 degrees C. or higher during transport.

In this example, the functional dye material contained in the dye plate 30A is an irreversible thermosensitive material that has the first light reflectance under a temperature lower than the temperature threshold, which is 50 degrees C., for example, then changes the light reflectance to the second light reflectance that is higher than the first light reflectance if exposed to a temperature that is equal to or higher than the temperature threshold for a prescribed period of time, and thereafter keeps the second light reflectance regardless of the temperature change. That is, the dye plate 30A contains a functional dye material that changes the light reflectance thereof when the ambient temperature goes beyond a prescribed temperature threshold and that maintains the post-change reflectance regardless of the ambient temperature.

During transport, the RFID sensor tag 200 cannot receive power from the reader/writer 300 via wireless communications, and therefore, all operations of the communication circuit 100A are stopped.

Figure 17:
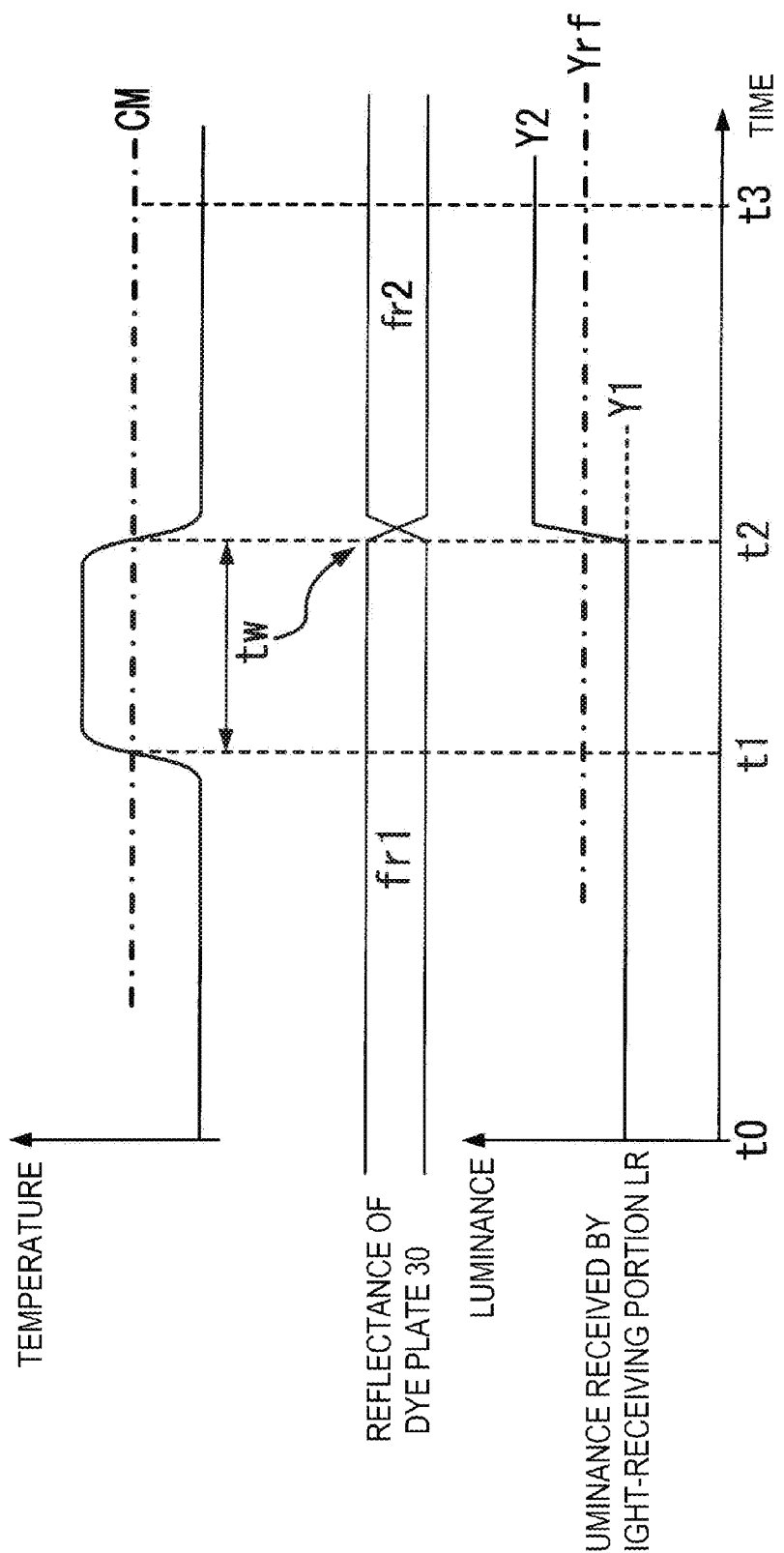
FIG. 17 is a diagram showing an example of the transition of the ambient temperature of the RFID sensor tag 200 having the configuration illustrated in FIGS. 14 to 16, the light reflectance of a color plate 30A, and the luminance of the incident light on a light-receiving portion LR.

As shown in FIG. 17, since the ambient temperature is lower than the predetermined temperature threshold CM (for example, 50 degrees C.) in the time period from the time t0, which is the start of the transport, to the time t1, the light reflectance of the dye plate 30 is fr1. Thus, in the time period form the time t0 to the time t1, the luminance of light received by the light-receiving portion LR through the dye plate 30A is Y1.

After passing the time t1, as shown in FIG. 17, the ambient temperature goes above the temperature threshold CM and stays at the level for a prescribed period of time tw. At the time t2 after the prescribed period of time tw has passed, the ambient temperature goes down to a level lower than the temperature threshold CM.

As described above, when exposed to a temperature equal to or higher than the temperature threshold CM over the predetermined period tw, the light reflectance of the dye plate 30A changes from the light reflectance fr1 to a light reflectance fr2, which is higher than the light reflectance fr1.

As shown in FIG. 17, after the time t2, the ambient temperature goes down to a level lower than the temperature threshold CM, but the dye plate 30A keeps the light reflectance fr2. Thus, after the time t2, the luminance of reflection light from the dye plate 30A received by the light-receiving portion LR maintains the state of the luminance Y2 that is higher than the luminance Y1 regardless of a change in ambient temperature as shown in FIG. 17. As described above, the power is not supplied from the reader/writer 300 during transport, and thus, the optical sensor 105 of the RFID sensor tag 200 does not generate the luminance signal Y during this time.

Thereafter, at the time t3 shown in FIG. 17, the RFID sensor tag 200 enters the communication area TA of the reader/writer 300 as shown in FIG. 6. As a result, the communication circuit 100A of the RFID sensor tag 200 receives power from the reader/writer 300 via wireless communications and performs the operations described below.

That is, first the command code requesting the luminance information is sent from the reader/writer 300 to the RFID sensor tag 200. Upon receiving the request for luminance information, the RFID sensor tag 200 first causes the light-emitting element 108 to emit light. Light is radiated to the dye plate 30A from the light-emitting portion EM of the light-emitting element 108, and reflection light from the dye plate 30A enters the light-receiving portion LR. As a result, at the time t3, the RFID sensor tag 200 transmits the luminance information IL indicating the luminance Y2 shown in FIG. 17 to the reader/writer 300 as the luminance of the reflection light from the dye plate 30A, which was detected by the optical sensor 105. Upon receiving the luminance information IL, the reader/writer 300 compares the size of the luminance Y2 indicated by the luminance information IL with the size of the reference luminance Yrf shown in FIG. 17.

In this example, since the luminance Y2 indicated by the luminance information IL is higher than the reference luminance Yrf, the reader/writer 300 displays an image indicating that the RFID sensor tag 200 has been under an ambient temperature higher than the ambient temperature CM.

As a result, the user is made aware of the fact that the article or food item has been under a temperature higher than the temperature threshold CM during transport, and thus the quality of the article or food item has deteriorated.

On the other hand, if the RFID sensor tag 200 enters the communicable area TA of the reader/writer 300 shown in FIG. 6 at the time t 1 shown in FIG. 17, the RFID sensor tag 200 transmits the luminance information IL representing the luminance Y1 shown in FIG. 17 to the reader/writer 300. Upon receiving the luminance information IL, the reader/writer 300 compares the size of the luminance Y1 indicated by the luminance information IL with the size of the reference luminance Yrf shown in FIG. 17. Because the luminance Y1 indicated by the luminance information IL is smaller than the reference luminance Yrf, the reader/writer 300 displays an image indicating that the RFID sensor tag 200 has continuously been under a temperature lower than the temperature threshold CM.

As a result, the user is made aware of the fact that the article or food item has not been under a temperature higher than the temperature threshold CM during transport, and thus the quality of the article or food item has not deteriorated.

In the example shown in FIG. 17, when the surrounding temperature exceeds the temperature threshold CM, the dye plate 30A increases the luminance of the light incident on the light-receiving portion LR from the luminance Y1 to the luminance Y2. However, the dye plate 30A may alternatively contain a functional dye material that changes the reflectance thereof so that the luminance of the light incident on the light-receiving portion LR lowers from the luminance Y1 to a prescribed level lower than the luminance Y1 when the ambient temperature exceeds the temperature threshold CM. In this case, the reference luminance Yrf is set to a value higher than the prescribed level and lower than the luminance Y1.

The dye plate 30A may alternatively contain a functional dye material that changes the reflectance thereof so that the luminance of the light incident on the light-receiving portion LR changes from the luminance Y1 to a prescribed level lower or higher than the luminance Y1 when the ambient temperature goes below the temperature threshold CM (0 degrees C. for example).

In the configuration shown in FIGS. 14 to 16, the dye plate 30A includes a functional dye material that changes the light reflectance in accordance with a change in temperature, but a dye plate containing a functional dye material that changes the light absorption rate in accordance with a change in temperature may alternatively be used.

Figure 18:
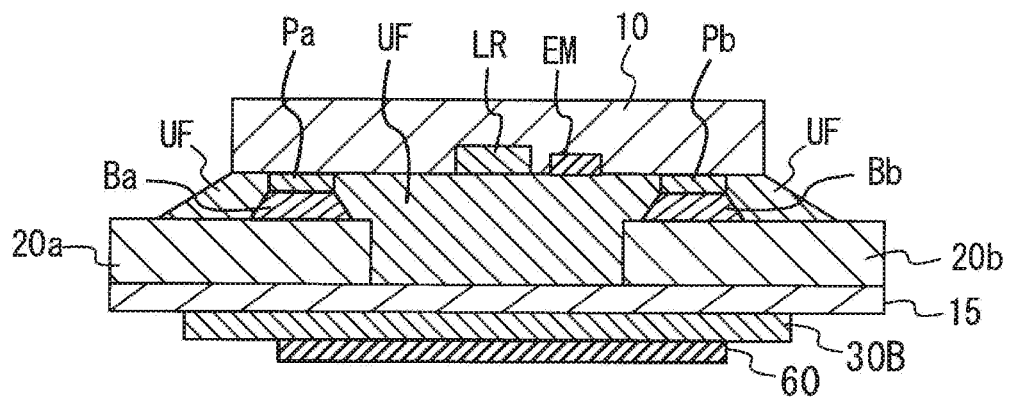
FIG. 18 is a cross-sectional view showing another example of the cross-sectional structure of the RFID sensor tag 200, taken along the line W-W of FIG. 14.

FIG. 18 is a cross-sectional view taken along the line W-W of FIG. 14, showing another example of the cross-sectional structure of the RFID sensor tag 200, which was made in view of such a point.

In the configuration of FIG. 18, a dye plate 30B is used instead of the dye plate 30A. The dye plate 30B contains an irreversible functional dye material that has the first light absorption rate under a temperature lower than the temperature threshold, then changes the light absorption rate to the second light absorption rate when the ambient temperature goes beyond the temperature threshold, and thereafter keeps the second light absorption rate even if the ambient temperature goes back to a level below the temperature threshold. That is, the dye plate 30B contains a functional dye material that changes the light absorption rate thereof when the ambient temperature goes beyond a prescribed temperature threshold and that maintains the post-change light absorption rate regardless of the ambient temperature.

In a manner similar to the dye plate 30, the dye plate 30B is disposed at a position facing the RFID chip 10 on the other surface of the substrate 15 (the surface on which the antennas 20a and 20b are not printed).

Further, in the embodiment shown in FIG. 18, a reflector plate 60 is attached on the surface of the dye plate 30B to overlap with the region between the end portion Ea of the antenna 20a and the end portion Eb of the antenna 20b, the region facing the light-receiving portion LR and the light-emitting portion EM. The reflector plate 60 reflects light having a wavelength that can be received by the light-receiving portion LR of the optical sensor 105, among the light radiated from the light-emitting portion EM, with a reflectance equal to or greater than a prescribed level. Thus, the optical sensor 105 detects reflection light with a high luminance when the light absorption rate of the dye plate 30B is low, and detects reflection light with a low luminance when the light absorption rate of the dye plate 30B is high.

The configuration shown in FIGS. 14 to 16 may have a blocking structure so that light that creates noise from the outside of the RFID sensor tag 200 and light having the wavelength that can pass through the reflector plate 60 do not reach the surface of the RFID chip 10 through the dye plate 30B.

Figure 19:
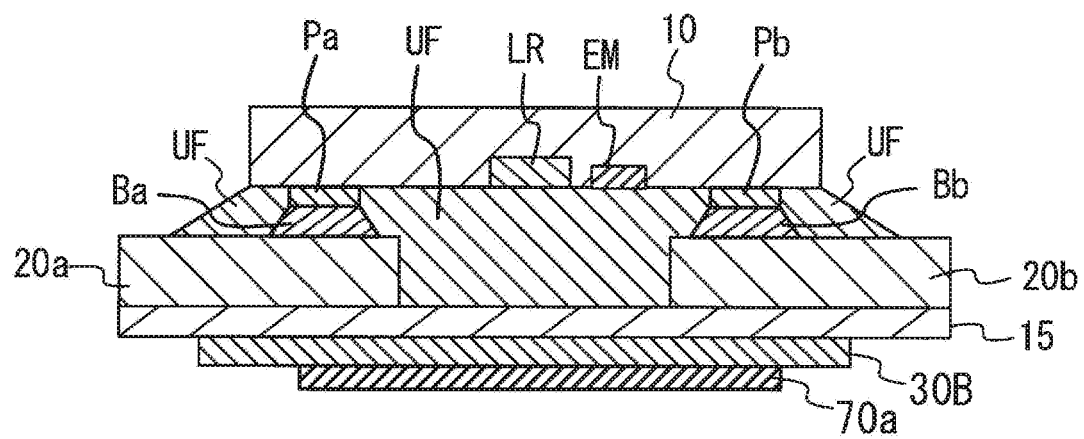
FIG. 19 is a cross-sectional view showing another example of the cross-sectional structure of the RFID sensor tag 200, taken along the line W-W of FIG. 14.

FIG. 19 is a cross-sectional view taken along the line W-W of FIG. 14, showing another example of the cross-sectional structure of the RFID sensor tag 200, which was made in view of such a point.

The configuration of FIG. 19 is the same as the configuration of FIG. 18 except that a light-shielding plate 70a that blocks light is used instead of the reflector plate 60.

A light-shielding plate may also be provided on the other surface (the surface on which the light-receiving portion LR and the light-emitting portion EM are not formed) of the RFID chip 10 so that light radiated from a light source located above the other surface of the RFID chip 10 is blocked.

Figure 20:
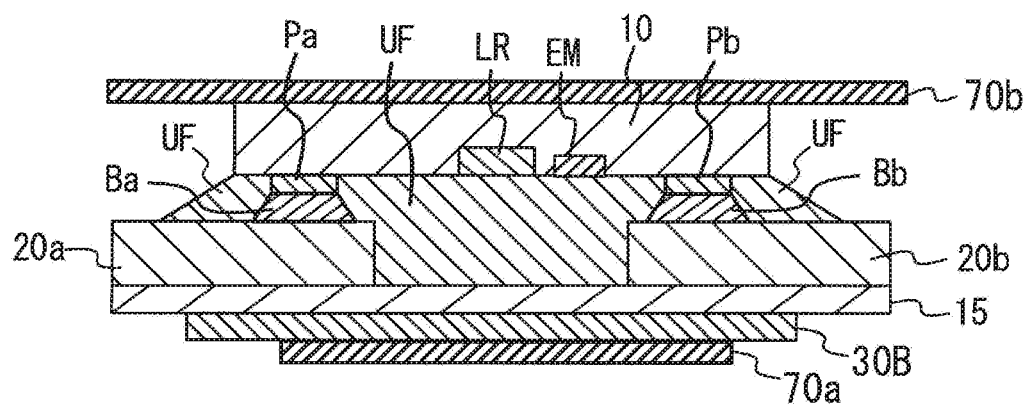
FIG. 20 is a cross-sectional view showing another example of the cross-sectional structure of the RFID sensor tag 200, taken along the line W-W of FIG. 14.

FIG. 20 is a cross-sectional view taken along the line W-W of FIG. 14, showing another example of the cross-sectional structure of the RFID sensor tag 200, which was made in view of such a point.

The configuration of FIG. 20 is the same as the configuration of FIG. 19 except that a light-shielding plate 70b is added.

The reflector plate 60 of FIG. 18 and the light-shielding plate 70a of FIGS. 19 and 20 has a surface area that is approximately as large as the surface of the RFID chip 10. In other words, while a length or width dimension of the reflector plate 60 or light-shielding plate 70a may be more or less than that of the RFID chip 10 (as shown in FIGS. 18-20), the surface area of both the reflector plate (or the light-shielding plate 70a) and the RFID chip 10 may both be less than that of the dye plate 30B. By making the surface area of the dye plate 30B greater than the reflector plate 60 (or the light-shielding plate 70b), a change in color of the dye plate 30B may be readily detected.

In the embodiments described above, the dye plates 30, 30A, 30B, the reflector plate 60, and the light-shielding plates 70a and 70b do not necessarily have to be in a plate-shaped member. That is, for the dye plates 30, 30A, 30B, the reflector plate 60, and the light-shielding plates 70a and 70b, various types of optical member such as a plate or a film may be used.

In the embodiments described above, the dye plates 30, 30A, and 30B are an optical member that contains an irreversible thermosensitive material that changes the optical property (color, light reflectance, light absorption rate) thereof in accordance with a change in ambient temperature and that maintains the post-change optical property.

However, the dye plates 30, 30A, and 30B may alternatively be an optical member that contains a functional dye material that changes the optical property thereof when exposed to an environment where there is a certain type of gas, the humidity is below or above a prescribed level, the material is subjected to UV light radiation, or the material receives light having luminance higher than a prescribed level, or when the material is subjected to physical impact.

That is, the RFID sensor tag 200 needs to include the following member, optical sensor, and communication control unit. The member (30, 30A, and 30B) contains a functional dye material that changes an optical property thereof (such as color, light reflectance, and light absorption) in accordance with a change in ambient environment and that maintains the post-change optical property. The optical sensor (105) has a light-receiving portion (LR), and is disposed such that the light-receiving portion receives light that has passed through the member. The optical sensor detects luminance (Y) of light that is incident on the light-receiving portion. The communication control unit (CTRL, CTRLa) transmits information (IL) indicating the luminance detected by the optical sensor.

DESCRIPTIONS OF REFERENCE CHARACTERS

10 RFID CHIP 30, 30A, 30B DYE PLATE
100, 100A COMMUNICATION CIRCUIT
105 OPTICAL SENSOR
108 LIGHT-EMITTING ELEMENT
200 RFID SENSOR TAG

CTRL, CTRLa CONTROL UNIT
EM LIGHT-EMITTING PORTION
LR LIGHT-RECEIVING PORTION

What is claimed is:

1. A communication apparatus comprising:
    an optical layer containing a functional dye material having an optical property that changes based on a change in a surrounding environment, and such that, upon changing, the optical property remains changed;
    an optical sensor having a light-receiving portion and disposed such that the light-receiving portion receives light that has passed through said optical layer, the optical sensor being configured to detect luminance of light received by the light-receiving portion;
    a light-emitting element that emits light to said optical layer;
    a reflector plate that reflects, to said optical layer, light that is emitted from the light-emitting element to said optical layer and that passes through said optical layer; and
    a communication control unit that transmits information indicating the luminance of the light that has passed through said optical layer detected by the optical sensor;
    wherein the functional dye material has a light absorption rate that changes when an ambient temperature goes beyond a prescribed temperature threshold and that maintains a post-change light absorption rate regardless of the ambient temperature.

2. The communication apparatus according to claim 1, further comprising a power source circuit that generates a power source voltage based on high-frequency power received via wireless communication,
    wherein the optical sensor and the communication control unit are operated by the power source voltage generated by the power source circuit.

3. The communication apparatus according to claim 2,
    wherein the change in the surrounding environment is a change in ambient temperature,
    wherein the functional dye material is an irreversible thermosensitive material that changes color when the ambient temperature goes beyond the prescribed temperature threshold and that maintains a post-change color regardless of the ambient temperature, and
    wherein the optical sensor has different detection sensitivities between a wavelength of the post-change color of the functional dye material and a wavelength of a pre-change color of the functional dye material.

4. The communication apparatus according to claim 3, further comprising a memory that has stored therein information indicating a reference luminance,
    wherein the communication control unit transmits environment change information indicating whether the surrounding environment has changed or not based on a comparison result between the luminance detected by the optical sensor and the reference luminance stored in the memory.

5. The communication apparatus according to claim 4, further comprising an optical filter that filters out light that is not within a prescribed wavelength range, the optical filter being disposed on a path of light that is received by the light-receiving portion.

6. The communication apparatus according to claim 1, wherein the functional dye material has a light reflectance that changes when the ambient temperature goes beyond the prescribed temperature threshold and that maintains a post-change reflectance regardless of the ambient temperature.

7. The communication apparatus according to claim 1, further comprising a light-shielding plate that blocks light, other than light emitted from the light-emitting element, from entering the optical sensor.

8. The communication apparatus according to claim 1, wherein the change in the surrounding environment is a change in a level of a certain type of gas, a change in a level of humidity, a change in a level of UV light radiation, a change in a level of light such that a luminance of the light is higher than a prescribed level, or a change in a physical stress to which the optical layer is subjected due to physical impact.

9. A method to detect a change in an environment, comprising:

in an RFID chip,
  detecting, with an optical sensor of the RFID chip, luminance of light that has passed through an optical layer containing a functional dye material having an optical property that changes based on a change in a surrounding environment and that maintains a post-change optical property;
emitting light, with a light-emitting element of the RFID chip, to the optical layer;
reflecting, with a reflector plate of the RFID chip, light that is emitted from the light-emitting element to said optical layer and that passes through said optical layer;
detecting a change in the surrounding environment based on a comparison result between the detected luminance of the light that has passed through said optical layer and a reference luminance; and
providing information indicating the change in the surrounding environment by displaying an image;
wherein a functional dye material of the optical layer has a light absorption rate that changes when an ambient temperature goes beyond a prescribed temperature threshold and that maintains a post-change light absorption rate regardless of the ambient temperature.

* * * * *